United States Patent [19]

Wang

[11] Patent Number: 4,715,706
[45] Date of Patent: Dec. 29, 1987

[54] LASER DOPPLER DISPLACEMENT MEASURING SYSTEM AND APPARATUS

[76] Inventor: Charles P. Wang, 1180 Mahalo Pl., Compton, Calif. 90220

[21] Appl. No.: 920,660

[22] Filed: Oct. 20, 1986

[51] Int. Cl.[4] .............................................. G01C 3/08
[52] U.S. Cl. ....................................... 356/5; 356/28.5
[58] Field of Search ................................... 356/5, 28.5

[56] References Cited

U.S. PATENT DOCUMENTS

| | | | |
|---|---|---|---|
| 4,236,819 | 12/1980 | Green | 356/5 |
| 4,299,484 | 11/1981 | Holzapfel | 356/6 |
| 4,336,997 | 6/1982 | Röss et al. | 356/5 X |
| 4,466,738 | 8/1984 | Huang et al. | 356/28.5 X |

OTHER PUBLICATIONS

Wang et al, "Measurement and Control of Subangstrom Mirror Displacement by Acousto-Optical Technique," Rev. Sci. Instrum, Jul. 1, 1982, pp. 963-966.

Primary Examiner—Stephen C. Buczinski
Assistant Examiner—Linda J. Wallace
Attorney, Agent, or Firm—Keith D. Beecher

[57] ABSTRACT

Apparatus for the precise measurement of the displacement of a moving cooperative target from a reference position, traveling, for example, over a distance of several meters, and with the measurement accuracy being better than a fraction of a millimeter. The apparatus includes a low-cost laser which generates a beam of a selected frequency. The laser beam is directed at the moving target and is reflected by the target. The apparatus also includes additional elements which measure the Doppler phase shift of the reflected laser beam so as to obtain a precise measurement of the displacement of the target with respect to the reference position.

4 Claims, 4 Drawing Figures

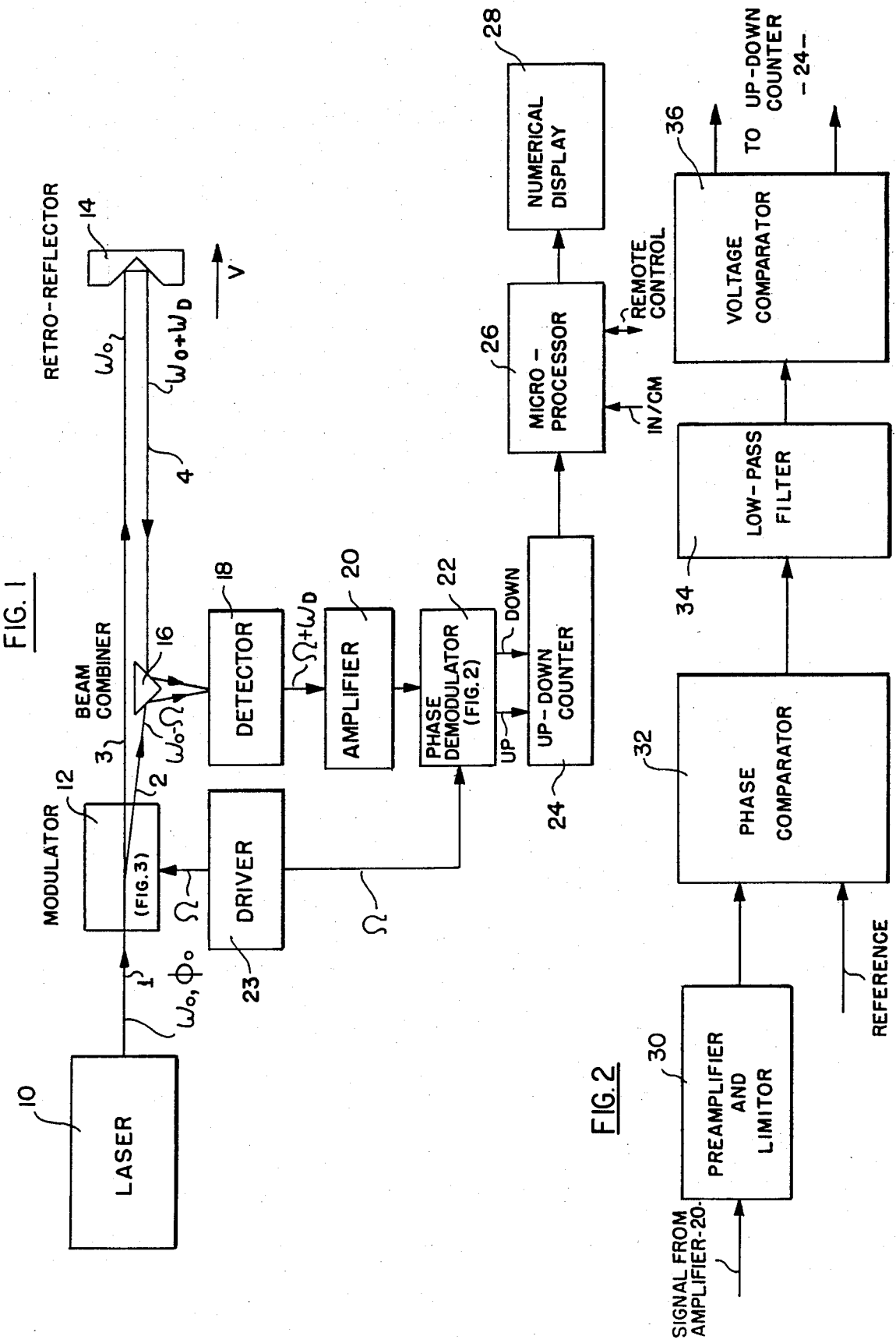

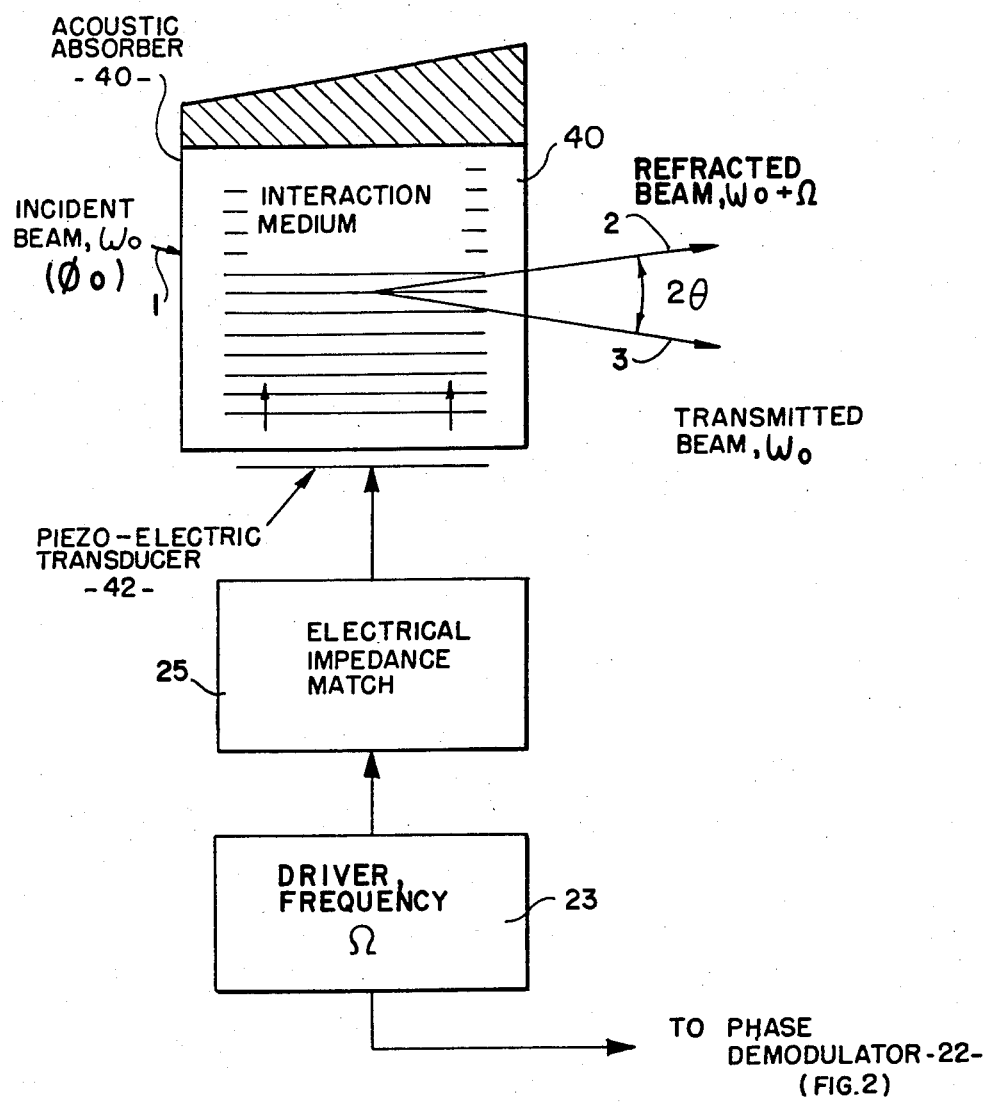
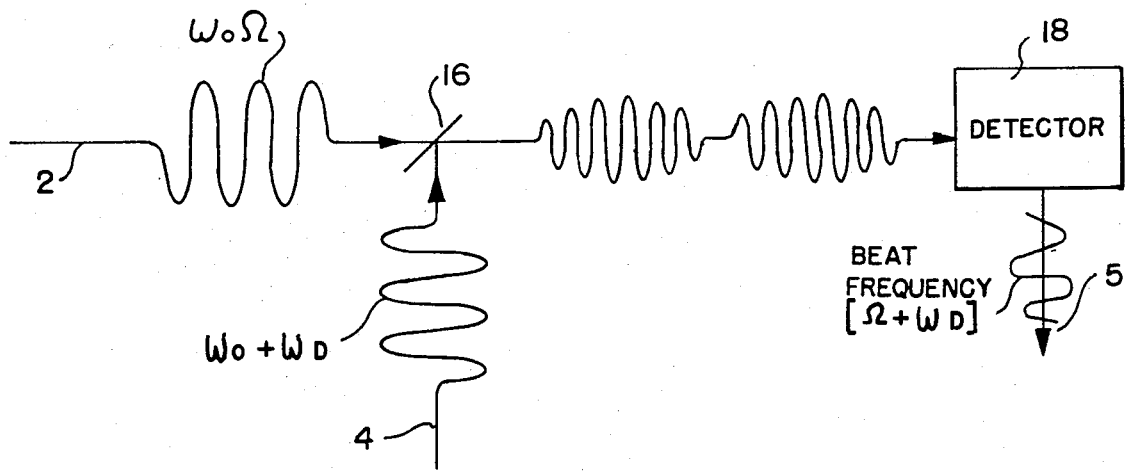

LASER DOPPLER DISPLACEMENT MEASURING SYSTEM AND APPARATUS

BACKGROUND OF THE INVENTION

There are many systems in the prior art for precisely measuring the displacement of an object. These include, for example, optical scale system, magnetic scale systems, fiber optic systems, interferometer systems, and other types of systems and apparatus. For example, F. Parmigiani describes in Optical and Quantum Electronics, 10, pages 533–535 (1978), a fiber-optic probe apparatus which is used to measure small displacements. F. Bien, M. Camac, H. J. Caulfield and S. Ezekiel, describe in Applied Optics, 20, pages 400–403 (1981), a system which uses variable wavelength interferometer techniques to measure absolute distances. A. Olsson and C. L. Tang, describe in Applied Optics, 20, pages 3503–3507 (1981), a system using dynamic interferometry techniques to measure small optical path length changes. C. P. Wang, R. L. Varwig and P. J. Ackman describe in the Review of Scientific Instruments, 53,, pages 963–966 (1982), a system using acousto-optical techniques to measure mirror displacements of extremely short ranges. J. Berger and R. H. Lovberg described in Science, 107, pages 296–303 (1970), apparatus using a laser interferometer to measure earth strain.

There are also commercial displacement measuring devices available on the market. These include, for example, the Laser Position Transducer, Model HP5527A, manufactured by Hewlett-Packard, Palo Alto, Calif.; the Interferometric Position Sensor, Model TIPS-IV, manufactured by Telectrac, Goleta, Calif.; the Interferometer System III, Model 7910, manufactured by Mark-Tech, San Jose, Calif.; an Optical Encoder Gauge, manufactured by Bausch & Lomb, Rochester, N.Y.; and a Magnetic Encoder Gauge, manufactured by Sony of Japan. In general, the devises using interferometric techniques are more accurate than those using optical encoding techniques, but alignment is more critical in the former, and therefore they are more expensive.

It is also usual practice in the prior art to utilize Doppler radar principles for measuring the velocity of a moving target. Typical apparatus is described, for example, in a text by M. I. Skolnik, entitled "Introduction to Radar Systems", Chapter 3, McGraw-Hill, New York (1980); and in an article entitled "Laser Doppler Velocimeter", by C. P. Wang, American Scientist, 65, Pages 289–293 (1977).

Most prior art precision displacement measuring devices use interferometer techniques, and such prior art devices usually include an expensive, sophisticated frequency stabilized laser to provide measurements. Accordingly, the prior art precision displacement measuring apparatus is extremely critical insofar as alignment is concerned, and it is very expensive. The apparatus of the present invention, on the other hand, is of the electro-optical type, and it uses the Doppler shift of a laser frequency caused by a moving target accurately to measure its displacement over several meters.

Specifically, the apparatus of the present invention is based on radar principles, Doppler effects and optical heterodyning. The apparatus of the invention is similar in some respects to a Doppler radar system, in that the target in the system of the invention is a moving retro-reflector. However, in the apparatus of the invention the target is illuminated by a laser beam. The laser beam reflected by the retro-reflector target is frequency shifted by the movement of the target. The Doppler frequency shift of the reflected laser beam is proportional to the velocity of the target, and the phase shift of the reflected laser beam is proportional to the displacement of the target from a reference position.

The system and apparatus of the invention includes a phase detector which is used to detect the phase shift of the reflected laser beam which, as mentioned above, represents the displacement of the retro-reflector target from a reference position. When the displacement of the target is greater than a half-wavelength, a counter may be used in the apparatus to determine the total phase changes. The apparatus also includes a microprocessor which reads the count of the counter, and the phase angle of the reflected laser beam, and which functions to convert the readings into inches or centimeters.

Briefly stated, the apparatus of the present invention is advantageous as compared with the prior art apparatus, in that it is compact, simple to use, requires no precise fittings or critical alignments, and it exhibits drift-free accuracy.

The apparatus and system of the invention is predicated upon unique optical heterodyne and optical modem principles which make for practical, economical, versatile, accurate, and convenient displacement measurements. Furthermore, the apparatus of the invention is advantageous in that it can use readily available inexpensive lasers. Moreover, the apparatus of the invention is fast acting, in that it exhibits a slew rate higher than 50 m/minutes in a constructed embodiment. The apparatus of the invention is simple in its construction in that it does not require an interferometer, and it is easy to align since it possesses large misalignment tolerances of the order of 30 seconds in angle and 1 millimeter in position.

Specifically, the advantages of the system and apparatus of the present invention include the following:

A. There is no requirement for calibration, since measurements are made using the speed of light and laser frequency;

B. There are no critical alignment or precision fitting requirements;

C. The retro-reflector target does not require an interferometer module;

D. The apparatus does not exhibit any wear, backlash, or periodic errors; and

E. The apparatus uses available low-cost laser as its light source.

BRIEF DESCRIPTION OF THE DRAWINGS

FIG. 1 is a block diagram of one embodiment of the invention;

FIG. 2 is a block diagram of the various elements which make up one of the components of the embodiment of FIG. 1;

FIG. 3 is a schematic representation of an acoustic-optic modulator which is included in the system of FIG. 1; and FIG. 4 is a diagram useful in explaining the optical heterodyned technique which is used in the system.

DETAILED DESCRIPTION OF THE ILLUSTRATED EMBODIMENT

The system of FIG. 1 includes a laser 10 which may be any inexpensive readily available laser, such as the Hughes Model 3221Hc helium-neon laser. Laser 10 generates a laser beam 1 which passes through a modulator 12. Modulator 12 is an acousto-optic modulator, which is avialable on the market, and may, for example, be the Isomate Model 1201. The modulator produces a beam 3 which is directed to a moving retroreflector target 14. Target 14 is moving at a velocity V in a direction indicated by the arrow. The modulator also produces a deflected beam 2 which is directed to a beam combiner 16, as is a reflected beam 4 from the retroreflector 14. Beams 2 and 4 are reflected by the beam combiner 16 to a detector 18. Detector 18 is a heterodyne photo-detector, and may, for example, be a Meret Model R1800. The electrical output of detector 18 is amplified in an amplifier 20, and the amplified signal is introduced to a phase demodulator 22. An oscillator/driver 23 introduces an electrical signal of frequency $\Omega$ to modulator 12 and to phase demodulator 22. The output of phase demodulator 22 is fed to an up-down counter 24 which may be of the type designated 74LS190. The output of the up-down counter is applied to a microprocessor 26 which may be of the type designated HO68PO5WD. An output from the microprocessor is introduced to a numerical display 28 which may be of the type designated LIT308.

The phase demodulator 22 is shown in more detail in the block diagram of FIG. 2. It includes an input preamplifier and limiter 30 which may be a Watkins-Johnson Model A54. Pre-amplifier 30 is connected to a phase comparator 32 which may be of the type designated MC12040. The other input of the phase comparator is connected to any appropriate reference voltage source. The output of the phase comparator is passed through a low pass filter 34 of the type designated CA3100 to a voltage comparator 36 which may be of the type designated CA3290E. The outputs from the voltage comparator 36 are applied to the up-down counter 24.

The modulator 12 of FIG. 1 is shown in greater detail in FIG. 3. The modulator includes an acoustic absorber 40 which includes an interaction medium on which the beam 1 from laser 10 is incident and which produces the laser beams 3 and 2, which are angularly displaced from one another by an angle $\alpha$. The acoustic absorber 40 also includes a piezoelectric transducer 42. The electrical signal from driver 23 is applied to the transducer through an electrical impedance matching network 25.

The frequency and phase of the laser beam 1 from laser 10 is $\omega_o$ and $\phi_o$. As shown in FIG. 3, modulator 12 acts on the beam to produce refracted beam 2 having a frequency of $\omega_o + \Omega$, while the frequency of beam 3 remains the same. The frequency of beam 4 reflected by retro-reflector target 14 is Doppler shifted to $\omega_o + \omega_D$, where $\omega_D$ is the Doppler shift proportional to the velocity V of the retro-reflector.

Beam combiner 16 combines beams 2 and 4, and applies the combined beams to the optical heterodyne detector 18, with the detector producing an electric signal 5 (FIG. 4) having a beat frequency of $\Omega + \omega_D$. This signal is amplified by amplifier 20 and applied to the phase demodulator 22. The output of the phase demodulator is proportional to the phase change $\Delta\phi$, which is related to the displacement $\Delta Z$ of the retroreflector by:

$$\Delta Z = \frac{C}{2\omega_o} \Delta\phi \qquad (1)$$

Finally, the measured $\Delta Z$ is converted to centimeters or inches by microprocessor 26 and displayed numerically by display 28.

The laser beam is passed through the interaction medium of acoustic absorber 40 of modulator 12 of FIG. 3 at almost right angles to the direction of propagation of acoustic waves. As was discussed by C. J. Quate et al in the Proceedings of the IEEE 53, Pages 1604–1623 (1965); and C. P. Wang et al in the Journal of Applied Physics, 50, pages 7917–7920 (1979) the transmitted beam 3 remains the same, and the direction and frequency of the defracted beam 2 is $\theta$ and $\omega_o - \Omega$ respectively. The angle $\theta$ is determined by $\theta = \lambda/\Lambda$, where $\lambda$ and $\Lambda$ are the laser wavelength and acoustic wavelength respectively. The intensity ratio can be calculated by:

$$\frac{I_1}{I_o} = \sin^2 \frac{\pi}{2} \sqrt{\frac{2 M_2 L P_{ac}}{\lambda^2 H}} \qquad (2)$$

where:

$I_o$ = transmitted laser intensity
$I_1$ = defracted laser intensity
$M_2$ = photoelastic figure of merit of the medium
$L$ = length of the photoelastic interaction
$H$ = width of the acoustic column
$P_{ac}$ = acoustic power of the interaction medium Similar to a Doppler radar, the target 14 in the system of the present invention is a retro-reflector, which is illuminated by the laser beam 3. The beam 4 reflected by the retro-reflector is frequency shifted by the motion of the retro-reflector target. The Doppler frequency shift can be expressed as:

$$\omega_D = \frac{2\omega_o}{C} \Delta V \qquad (3)$$

or $$\frac{\Delta\phi}{2\pi} = \frac{2\omega_o}{C} \Delta Z \qquad (4)$$

Where $\omega_D$ and $\Delta\phi$ are frequency and phase shifts respectively; $\Delta V$ and $\Delta Z$ are respectively the velocity and displacement of the retro-reflector, $\omega_o$ is the frequency of the laser, and C is the speed of light.

Driver 23 generates the carrier of frequency $\Omega$. The retro-reflector target 14 may be in the form of a corner cube which always reflects the laser beam back parallel to the incident beam, so that alignment is not critical. The beam combiner 16 is in the form of two mirrors which combine the returned laser beam 4 and the defracted laser beam 2.

As shown in FIG. 4, the beat signal $\Omega + \omega_D$ which is the sum of the carrier frequency $\Omega$ and the Doppler shift $\omega_D$ is obtained by an optical heterodyne technique in detector 18. The phase demodulator 22 compares the phases of the beat signal $\Omega + \omega_D$ and the reference signal with carrier frequency $\Omega$. The output $\Delta\Phi$ of the phase demodulator is proportional to the displacement $\Delta Z$ of the retro-reflector target 14. When the displacement $\Delta Z$ is larger than the half wavelength ($\lambda/2$), counter 24 is used to keep track of the total phase changes. That is:

$$\Delta\phi_{total} = 2\pi N + \phi \qquad (5)$$

Where N is the number of half wavelengths; and $\phi$ is the phase angle less than $2\pi$.

The total displacement $\Delta Z$ can be expressed as:

$$\Delta Z = \frac{C}{2\omega_0}\left(N + \frac{\phi}{2\pi}\right) \quad (6)$$

Microprocessor 26 is used to read the counter 24 and the phase angle, and to convert to inches or centimeters. The display 28 may be a ten digit display, and it is controlled by the microprocessor 26. The microprocessor compensates the change of the speed of light due to temperature, pressure and humidity changes, to communicate with the external computer or controller.

For simplicity, assume all laser beams are plane waves. Then beam 1 can be expressed as:

$$V_1 = (r,t) = a_1(r,t) \exp(i(\omega_o t + \phi_o)) \quad (7)$$

where r and t are position and time, respectively, $a_1$ is the amplitude, and $\omega_o$ and $\phi_o$ are frequency and phase respectively. After passing through the frequency modulator, the transmitted beam 3 and the defracted beam 2 can be expressed as:

$$V_3(r,t) = a_3(r,t) \exp i(\omega_o t + \phi_3) \quad (8)$$

$$V_2(r,t) = a_2(r,t) \exp i[(\omega_o + \Omega)t + \phi_2] \quad (9)$$

The Doppler shifted return beam 4 is then $$V_4(r,t) = a_4(r,t) \exp i[(\omega_o + \omega_D)t + \phi_4] \quad (10)$$

Combining beam 2 and 4 at a photodetector, the photocurrent $I_p$ is:

$$I_p(r_p,t) = \quad (11)$$

$$\frac{A}{T} \int_{t-T}^{t} dt \int^{r_p + d/2} |V_2(R,t) + V_4(r,t)|^2 2\pi r dr$$

Where $r_p$ and d are respectively the position and diameter of the photodetector, A is a detector constant depends on the quantum efficiency, heterodyne efficiency and sensitivity, and T is the average time interval which must be sufficiently longer than the period of the laser light.

Substituting $V_2$ and $V_4$ into the above equation, we obtain, $$I_p(r_p,t) = B \cos[(\Omega + \omega_D)t + \Delta\phi] \quad (12)$$

where both amplitude B and phase $\Delta\phi$, are constants.

A phase-demodulator is used to compare the phase shift of $I_p$ with the reference signal $I_{R(t)} = C \cos(\Omega t + \phi_R)$, where amplitude C and phase $\phi_R$ are constants. The phase-demodulator output is proportional to the phase difference which is the tiem integral of the frequency. i.e., $$\frac{\phi(t)}{2\pi} \int_o^t \omega_D dt \quad (13)$$

Since the Dopper shift can be expressed as:

$$\omega_D = \frac{2\omega_o}{C} u = \frac{2\omega_o}{C} \frac{dz}{dt} \quad (14)$$

where u and z are respectively the velocity and displacement along the direction of laser beam propagation.

Assume at $t=0$, both $\phi(0)=0$ and $z(o)=0$, then $$\frac{\phi(t)}{2\pi} = \int_o^t \omega_D \delta = \frac{2\omega_o}{C} \int_o^t \frac{dz}{dt} = \frac{2\omega_o}{C} z(t) \quad (15)$$

or $$\frac{\phi t}{2\pi} = \frac{2\omega_o}{C} z \quad (16)$$

Hence the phase-demodulator output is directly proportional to the displacement.

The invention provides, therefore, a relatively inexpensive system which uses Doppler radar techniques to measure the displacement of a moving target. The target, as described, is in the form of a retro-reflector which generates a return beam which is parallel to the incident beam, so that the range of the system can be extended to several meters without significantly displacing the return beam. Also, the use of the retro-reflector enables misalignment tolerances to become relatively large. As stated, the up-down counter 24 keeps track of the number of wavelengths, so that the total phase changes may be determined over a range of several meters without ambiguity.

It is to be understood that while a particular embodiment of the invention has been shown and described, modification may be made. It is intended in the claims to cover all modifications which come within the true spirit and scope of the invention.

I claim:

1. Apparatus for measuring the displacement of a moving retro-reflective target from a reference position comprising: a laser for producing a laser beam of a particular frequency $\omega_o$; oscillator means for producing an electrical heterodyning reference signal of a particular frequency $\Omega$; an optical modulator interposed between the laser and the target for passing the laser beam $\omega_o$ from the laser to the target to be reflected thereby as a reflected laser beam $\omega_o + \omega_D$ parallel to and displaced from the laser beam $\omega_o$ and having a frequency shift $\omega_D$ proportional to the velocity of the target and connected to said oscillator means for producing a refracted laser beam $\omega_o \pm \Omega$ having a frequency shifted by a predetermined amount $\Omega$; beam combining means positioned in the paths of the refracted beam $\omega_0 \pm \Omega$ from the modulator and the reflected beam $\omega_o + \omega_D$ from the target for combining the two beams and for producing a combined output beam $\Omega \pm \omega_D$ in response thereto; a photodetector positioned in the path of the combined output beam $\Omega + \omega_D$ from the beam combining means for producing an electrical beat output signal $\Omega + \omega_D$ in response thereto; means including a phase-demodulator coupled to said detector and to said oscillator means and responsive to the beat output signal $\Omega + \omega_D$ from said detector for comparing the phases of said beat output signal $\Omega + \omega_D$ and said reference signal $\Omega$ to produce an output signal $\Delta\phi$ having a phase displacement from said reference signal $\Omega$ proportional to the displacement $\Delta Z$ of the target from the reference position, $$\Delta Z = \frac{C}{2\omega_o}\left(N + \frac{\phi}{2\pi}\right),$$

where C is the speed of light, N is the number of half wavelengths, and $\phi$ is the phase angle less than $2\pi$; and for applying the heterodyning signal to the optical modulator and to the phase demodulator; and utilization means coupled to said phase demodulator and responsive to the output signal therefrom for providing a measurement of the displacement of the target from the reference position.

2. The apparatus defined in claim 1, in which said utilization means includes a microprocessor for converting the output signal of said phase demodulator into signals representative of the numerical value of the displacement of the target from the reference position.

3. The apparatus defined in claim 2, and which includes a numerical display coupled to the microprocessor.

4. The apparatus defined in claim 1, in which said utilization means includes an up-down counter for determining the total phase changes in the output signal of said phase demodulator when the displacement of the target from the reference position is greater than a half wavelength.

* * * * *